United States Patent
Kunieda

(10) Patent No.: US 7,524,350 B2
(45) Date of Patent: *Apr. 28, 2009

(54) CERAMIC HONEYCOMB STRUCTURAL BODY

(75) Inventor: Masafumi Kunieda, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/733,559

(22) Filed: Apr. 10, 2007

(65) Prior Publication Data

US 2007/0204580 A1 Sep. 6, 2007

Related U.S. Application Data

(63) Continuation of application No. PCT/JP2005/018991, filed on Oct. 11, 2005.

(30) Foreign Application Priority Data

Oct. 12, 2004 (JP) .............................. 2004-298028

(51) Int. Cl.
*B01D 39/20* (2006.01)
*B01D 50/00* (2006.01)
*B01D 39/00* (2006.01)
*B32B 3/00* (2006.01)
*B01J 21/04* (2006.01)

(52) U.S. Cl. ...................... 55/523; 55/282.2; 55/282.3; 55/385.3; 428/312.8; 502/439

(58) Field of Classification Search ................ 55/283.2, 55/283.3, 385.3, 523; 428/312.8; 502/439
See application file for complete search history.

(56) References Cited

U.S. PATENT DOCUMENTS

| | | | |
|---|---|---|---|
| 6,939,825 B1 | 9/2005 | Ohno et al. | |
| 7,119,046 B2 | 10/2006 | Ohno et al. | |
| 2003/0093982 A1* | 5/2003 | Suwabe et al. | ................ 55/523 |
| 2003/0175496 A1 | 9/2003 | Bishop et al. | |
| 2004/0033175 A1 | 2/2004 | Ohno et al. | |
| 2005/0102987 A1 | 5/2005 | Kudo | |

(Continued)

FOREIGN PATENT DOCUMENTS

DE 43 26 938 A1 2/1995

(Continued)

OTHER PUBLICATIONS

Kitagawa et al., Improvement of Pore Size Distribution of Wall Flow Type Diesel Particulate Filter, SAE Technical Paper Series, Feb. 1992.

*Primary Examiner*—Walter D Griffin
*Assistant Examiner*—Amber Orlando
(74) *Attorney, Agent, or Firm*—Ditthavong Mori & Steiner, P.C.

(57) ABSTRACT

This honeycomb structural body is made from a sintered body having a pore structure wherein pores having a pore size ranging from 1.0 μm to about 150 μm are a first pore group and pores having a pore size ranging from about 0.006 or more to less than 1.0 μm are a second pore group in a pore size distribution curve, one peak in the pore size distribution is existent in the first pore group region and plural peaks in the pore size distribution are existent in the second pore group region.

20 Claims, 10 Drawing Sheets

U.S. PATENT DOCUMENTS

| | | |
|---|---|---|
| 2005/0169818 A1 | 8/2005 | Ohno et al. |
| 2005/0176581 A1 | 8/2005 | Ohno et al. |
| 2006/0021310 A1 | 2/2006 | Ohno et al. |
| 2006/0051556 A1 | 3/2006 | Ohno et al. |
| 2006/0135343 A1 | 6/2006 | Ohno et al. |
| 2006/0166820 A1 | 7/2006 | Ogyu et al. |
| 2006/0179803 A1 | 8/2006 | Ohno et al. |
| 2006/0188415 A1 | 8/2006 | Ohno et al. |
| 2006/0194018 A1 | 8/2006 | Ohno et al. |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2006/0254231 A1 | 11/2006 | Hayashi et al. |
| 2006/0292393 A1 * | 12/2006 | Kunieda ............... 428/688 |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0065348 A1 | 3/2007 | Ohno et al. |
| 2007/0068128 A1 | 3/2007 | Oshimi et al. |
| 2007/0128405 A1 | 6/2007 | Sakaguchi et al. |
| 2007/0130897 A1 | 6/2007 | Sakaguchi et al. |
| 2007/0169453 A1 | 7/2007 | Hayakawa |
| 2007/0178275 A1 | 8/2007 | Takahashi |
| 2007/0190289 A1 | 8/2007 | Fujita |
| 2007/0190350 A1 | 8/2007 | Ohno et al. |
| 2007/0196620 A1 | 8/2007 | Ohno et al. |
| 2007/0212517 A1 | 9/2007 | Ohno et al. |
| 2007/0293392 A1 | 12/2007 | Ohno et al. |

FOREIGN PATENT DOCUMENTS

| | | |
|---|---|---|
| EP | 0 640 391 A2 | 3/1995 |
| JP | 7-227548 A | 8/1995 |
| JP | 09-158710 | 6/1997 |
| JP | 09-313843 | 12/1997 |
| JP | 10-156118 | 6/1998 |
| JP | WO2004076027 * | 2/2004 |
| JP | 2004-148308 | 5/2004 |
| JP | 2004-330118 | 11/2004 |
| WO | WO 03/078672 A1 | 9/2003 |
| WO | PCT/JP2005/018991 | 12/2005 |
| WO | WO 2006/025498 | 3/2006 |
| WO | WO 2006/035645 | 4/2006 |
| WO | WO 2006/035822 | 4/2006 |
| WO | WO 2006/035823 | 4/2006 |

* cited by examiner (a)"

CERAMIC HONEYCOMB STRUCTURAL BODY

RELATED APPLICATION

This application is an application claiming a priority right based on Japanese Patent Application of 2004-298028 filed on Oct. 12, 2004 and PCT application of PCT/JP2005/018991 filed on Oct. 11, 2005, of which contents are incorporated therein by reference in its entirety.

TECHNICAL FIELD

This invention relates to a ceramic honeycomb structural body.

BACKGROUND ART

The exhaust gas discharged from the internal combustion engine in vehicles such as truck and bus, construction vehicles or the like contains particulates, which is pointed to badly exert upon environment and human body. For this end, it is demanded to develop techniques for removing the particulates from the exhaust gas. As an example of such techniques, for example, there is a ceramic honeycomb structural body for the purification of an exhaust gas using a porous ceramic member of a honeycomb structure (ceramic honeycomb structural body) for collecting and removing the particulates from the exhaust gas.

A typical example of such a ceramic honeycomb structural body, as shown in FIG. 1(b), is used as ceramic honeycomb filter 10, formed by combining a plurality of pillar-shape porous ceramic members 11 by interposing sealing material layers 14 to form a ceramic block and to form an outer periphery of the ceramic block with a sealing material layer 16 for preventing the leakage of the exhaust gas. As illustrated, the ceramic honeycomb filter 10 is constituted by bundling a plurality of ceramic members (units) 11 each having a pillar-shape honeycomb structure as one constitutional unit. In the each ceramic member 11, many cells 12 as a path for the exhaust gas are arranged in parallel to each other in longitudinal direction through cell walls 13. The particulates in the exhaust gas are removed by the cell walls 13 when the exhaust gas passes through the cell walls 13 (wall flow).

The conventional honeycomb filter for the purification of the exhaust gas has improved the exhaust gas purifying property by adjusting the size of pores (pore size) and pore size distribution in the cell wall 13. For example, JP-A-H09-313843 proposes a honeycomb structural body having such a pore structure that the pore size distribution produced in the cell wall of aluminum titanate is divided into a first region having a pore size ranging from 2 to 150 µm and a second region having a pore size ranging from 0.08 to 1 µm and each of the regions has a maximum value. The contents of JP-A-H09-313843 are incorporated therein by reference in its entirety.

DISCLOSURE OF THE INVENTION

The invention is characterized in that; a ceramic honeycomb structural body comprising one pillar-shape porous ceramic member or formed by bundling a plurality of the ceramic members in which many cells as a gas path are arranged in parallel through cell walls in a longitudinal direction and one ends of these cells are sealed, characterized in that the cell wall is made from a sintered body having a pore structure that in a pore size distribution curve wherein an abscissa is a pore diameter (µm) and an ordinate is a log differential pore volume ($cm^3/g$), when pores having a pore size ranging from 1.0 to about 150 µm are a first pore group and pores having a pore size ranging from about 0.006 or more to less than 1.0 µm are a second pore group, one peak in the pore size distribution is existent in the first pore group region and plural peaks in the pore size distribution are existent in the second pore group region.

In the above-mentioned ceramic honeycomb structural body, the peak of the pore size distribution appearing in the second pore group region is preferably existent respectively in pore sizes ranging from about 0.006 or more to less than 0.05 µm and ranging from 0.05 to 1.0 µm.

In the above-mentioned ceramic honeycomb structural body, the pore distribution having a pore diameter ranging from about 0.1 µm to 1.0 µm appearing in the second pore group is preferably represented by a feature that a curve of a value of the log differential pore volume is continuous.

In the above-mentioned ceramic honeycomb structural body, the pore distribution having a pore diameter ranging from about 0.01 µm to 1.0 µm appearing in the second pore group is preferably represented by a feature that a curve of a value of the log differential pore volume is continuous.

In the above-mentioned ceramic honeycomb structural body, the pores existent between peaks appearing in the curve of the pore size distribution are preferably represented by a feature that the values of the log differential pore volume are continuous.

In the above-mentioned ceramic honeycomb structural body, the cell wall is preferably made from a porous silicon carbide.

The above-mentioned ceramic honeycomb structural body, is preferably structured by the combination of the porous ceramic members, with a seal material layer being disposed between them.

The above-mentioned ceramic honeycomb structural body is preferably structured by one porous ceramic member.

In the above-mentioned ceramic honeycomb structural body, a catalyst is preferably carried on the porous ceramic member.

The above-mentioned ceramic honeycomb structural body is preferably used as a filter for the purification of an exhaust gas in vehicles.

BEST MODE FOR CARRYING OUT THE INVENTION

Figure 1:
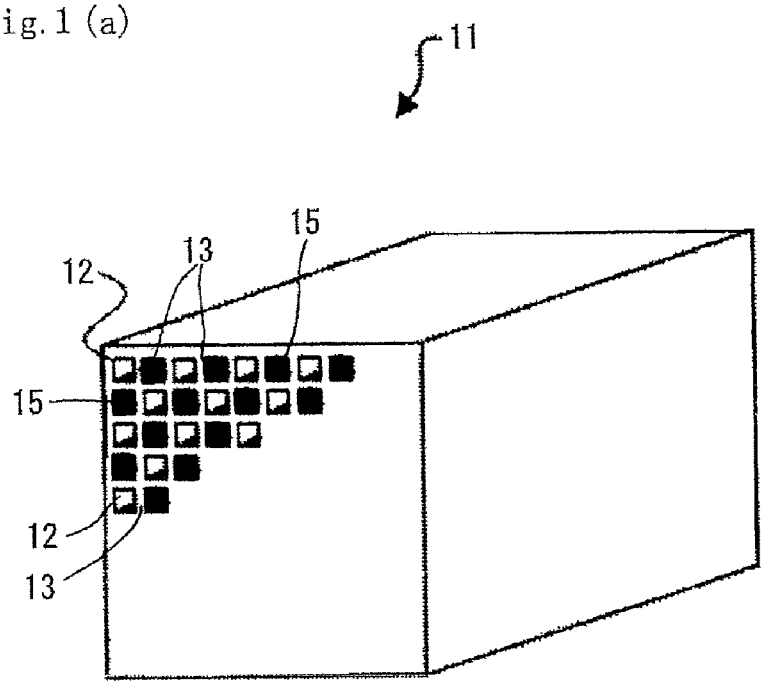
FIG. 1(a) is a perspective view of a porous ceramic member (unit) according to the mode of carrying out the invention and FIG. 1(b) is a perspective view of a collective type honeycomb structural body.
Figure 1:
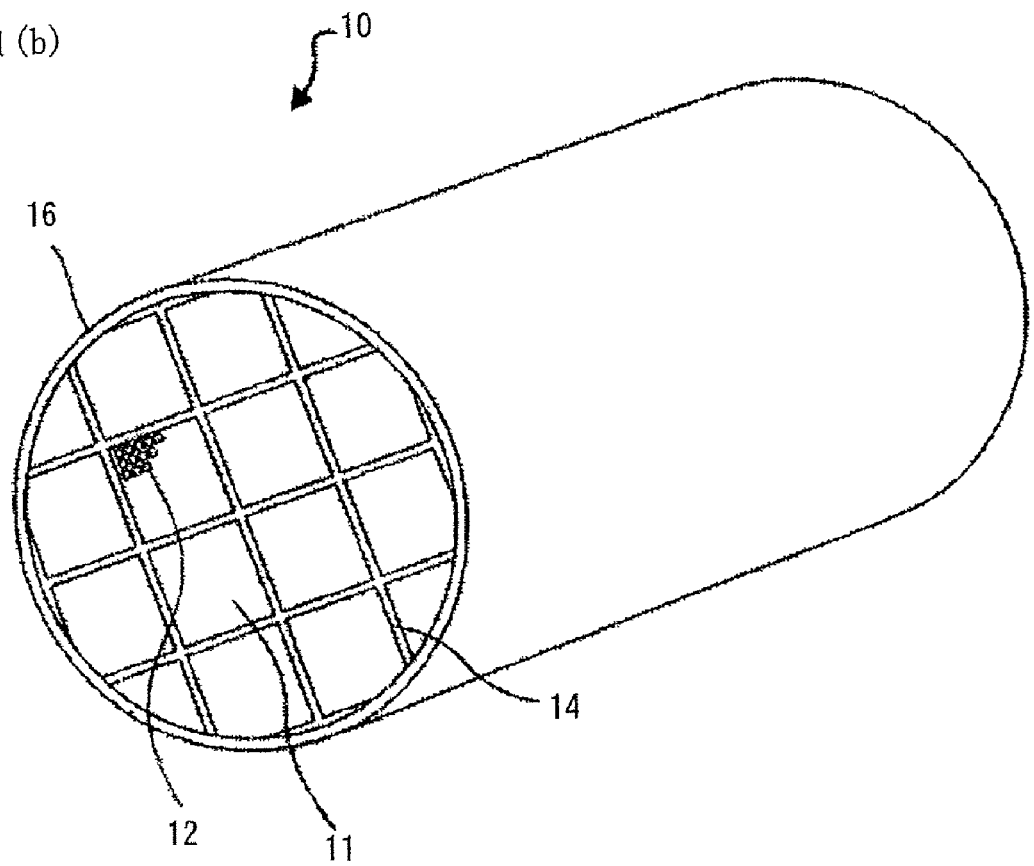

The mode of carrying out the invention is a ceramic honeycomb structural body comprising one pillar-shape porous ceramic member or formed by bundling a plurality of the ceramic members in which many cells as a gas path are arranged in parallel through cell walls in a longitudinal direction and one ends of these cells are sealed, characterized in that the cell wall is made from a sintered body having a pore structure that in a pore size distribution curve wherein an abscissa is a pore diameter (μm) and an ordinate is a log differential pore volume ($cm^3/g$), when pores having a pore size ranging from 1.0 to about 150 μm are a first pore group and pores having a pore size ranging from about 0.006 to less than 1.0 μm are a second pore group, one peak in the pore size distribution is existent in the first pore group region and plural peaks in the pore size distribution are existent in the second pore group region.

That is, the mode of carrying out the invention is characterized by using each wall partitioning the cells of the porous ceramic member, i.e. cell wall having a pore structure that when the distribution of pore diameters measured by a mercury pressure method of JIS R 1655 (2003) is represented by a graph, a peak (maximum value) of the pore size distribution is existent in the second pore group region. The contents of JIS R 1655 (2003) are incorporated therein by reference in its entirety.

In the invention, the peak of the pore size distribution appearing in the second pore group region is existent respectively in pore sizes ranging from about 0.006 to less than 0.05 μm and in pore sizes ranging from 0.05 to 1.0 μm, and that the pore distribution having a pore diameter ranging from about 0.1 to 1.0 μm appearing in the second pore group is represented by a feature that a value of the log differential pore volume is a number more than zero (positive number) and a curve thereof is continuous, and that the pore distribution having a pore diameter ranging from about 0.01 to 1.0 μm appearing in the second pore group is represented by a feature that a value of the log differential pore volume is a number more than zero (positive number) and a curve thereof is continuous, and that the pores existent between peaks appearing in the curve of the pore size distribution is represented by a feature that the values of the log differential pore volume are continuous (not zero), and that cell wall is made from a porous silicon carbide, and that a seal material layer is disposed between the porous ceramic members in the combination of these plural members, and that a catalyst is carried on the porous ceramic member, which could be effective means for the solution of the following problems; when the exhaust gas or the particulates included in the exhaust gas is purified (converted) by this kind of the honeycomb filter, with the secondary particulates (agglomerated particulates) having a particle size, nearly the pore size in the above second region, the particulates are compactly filled in the pores, the pressure loss becomes high and the regeneration reaction hardly occurs.

As mentioned above, in the ceramic honeycomb structural body according to the mode of carrying out this invention, at least the cell wall has a pore structure that plural peaks (maximum value) of the pore size distribution are existent in the region of the second pore group wherein the pore sizes are ranging from about 0.006 to less than 1.0 μm, so that a filter having an efficient collection and removal of harmful particulates in the exhaust gas and an excellent catalytic reaction efficiency for the conversion of harmful gas such as NOx can be more easily provided.

The inventors have examined the pore structure of the ceramic honeycomb structural body (sintered body) used as a filter for the purification of the exhaust gas, and particularly conducted experiments by controlling the kind and amount of the pore forming material to change the state of the pore size distribution. As a result, it is found that a large difference in the pressure loss of the ceramic honeycomb structural body and the combustion characteristics of the particulates is caused in accordance with the difference of the pore size distribution even if the porosity is same.

Figure 4:
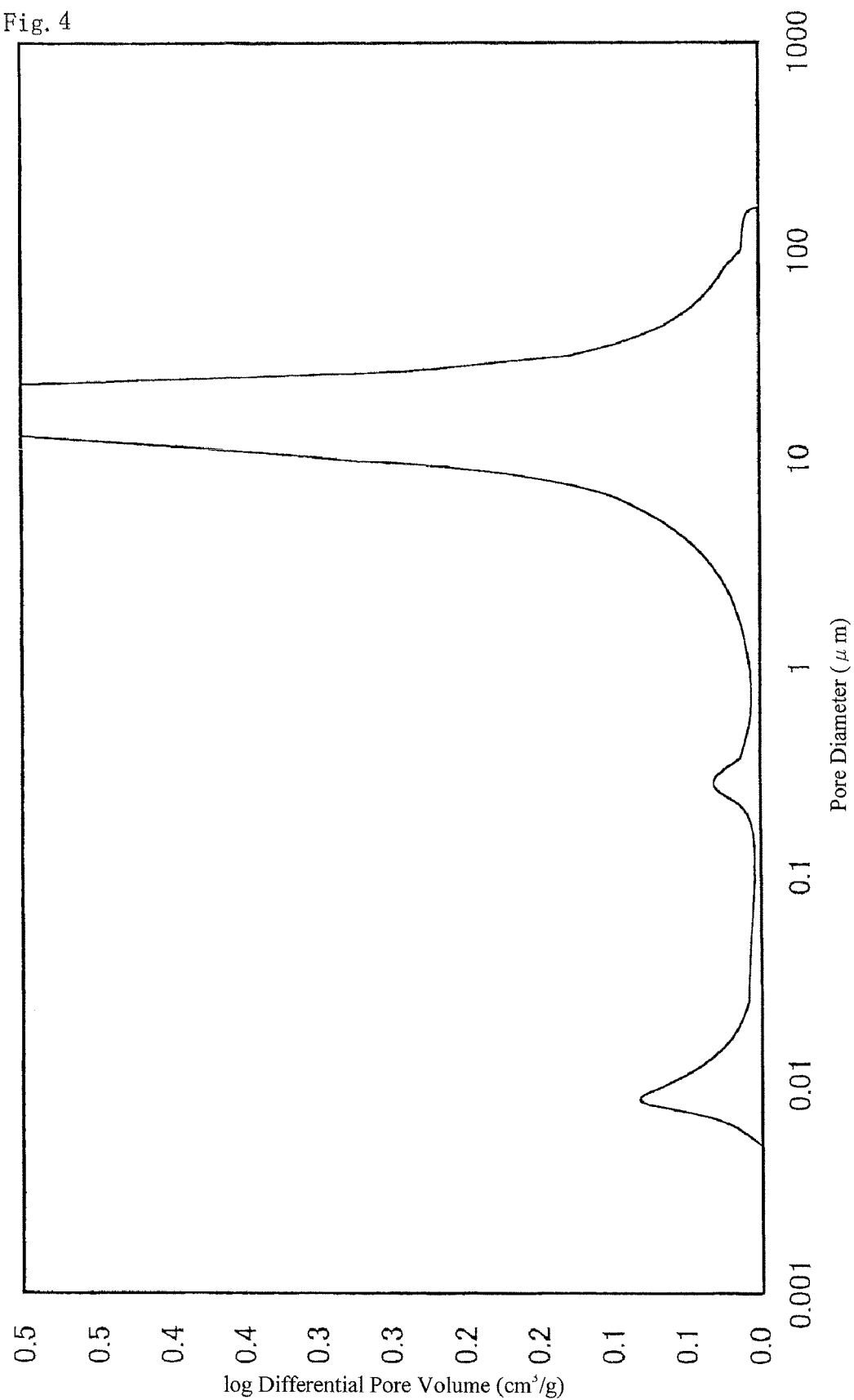
FIG. 4 is a view showing a pore size distribution curve of a ceramic honeycomb structural body according to the mode of carrying out the invention.
Figure 5:
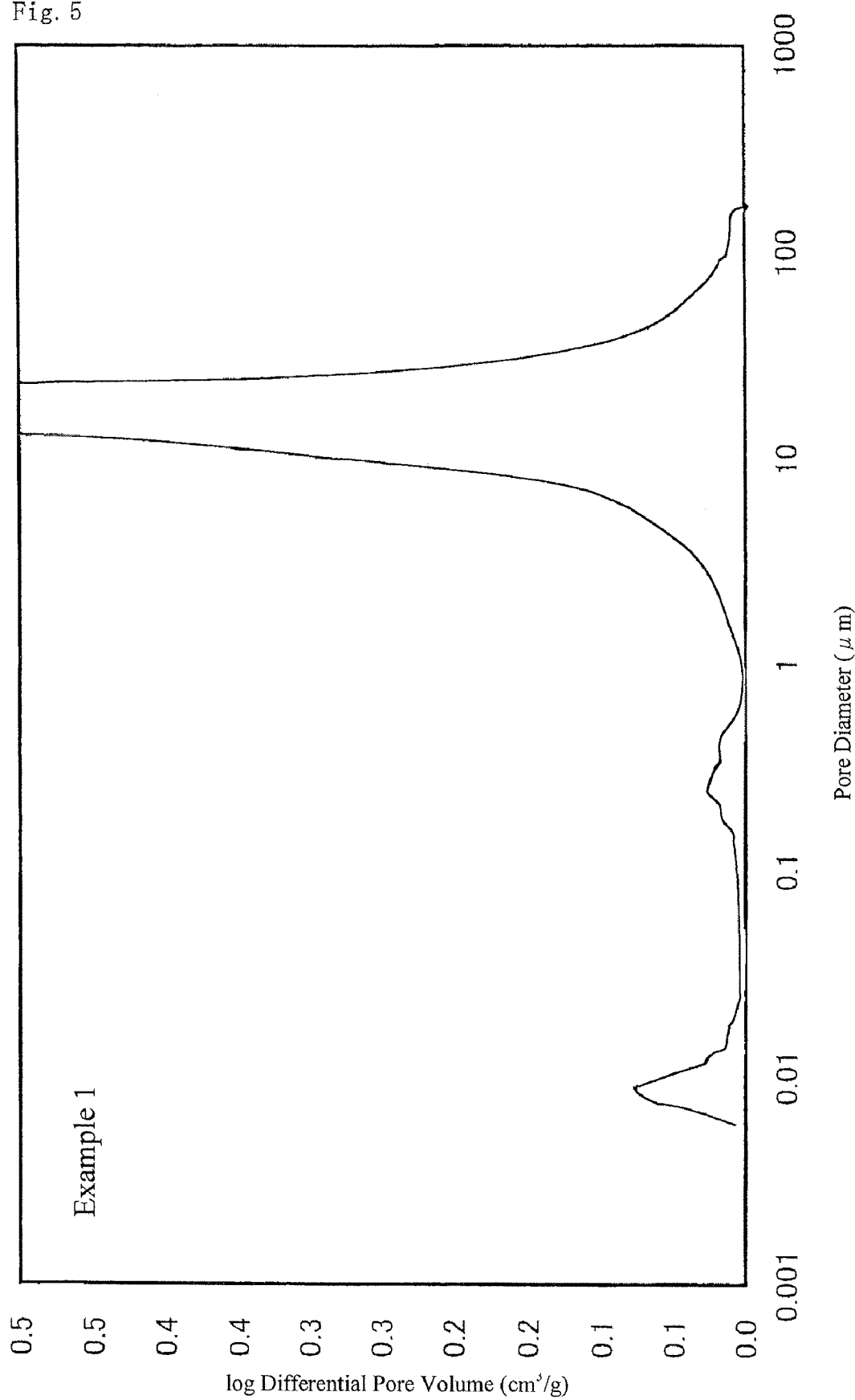
FIG. 5 is a view showing a pore size distribution curve in Example 1.
Figure 6:
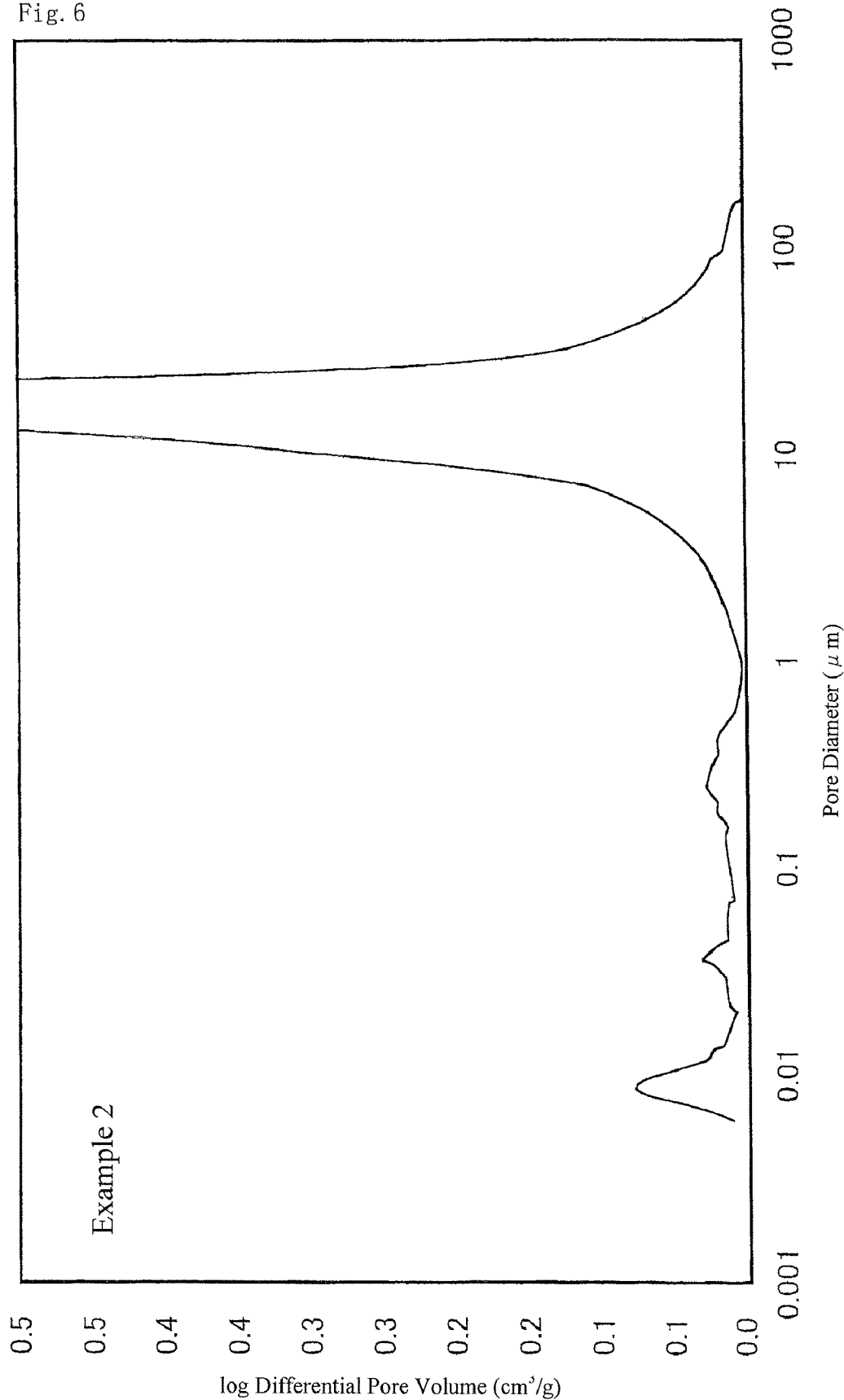
FIG. 6 is a view showing a pore size distribution curve in Example 2.
Figure 7:
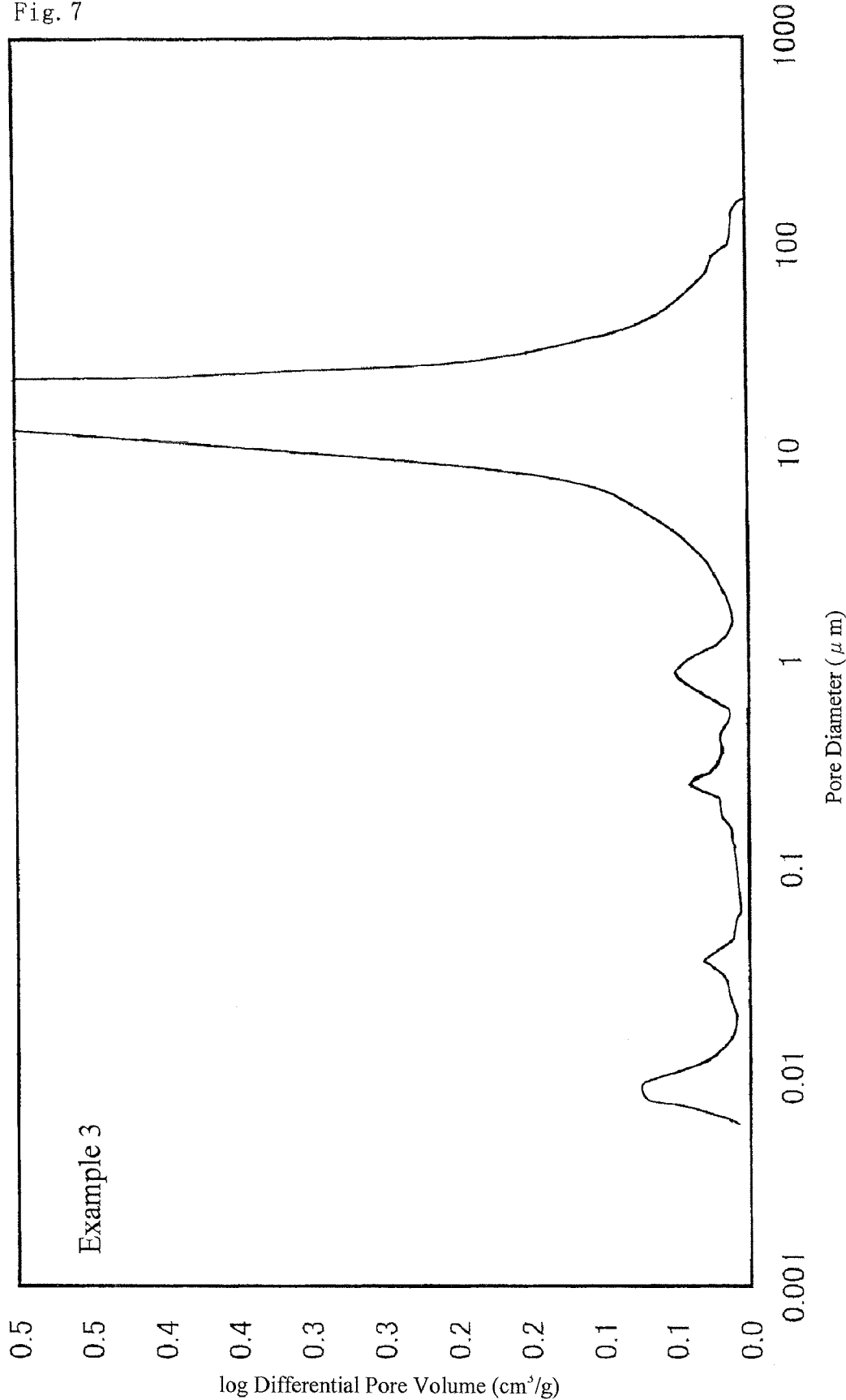
FIG. 7 is a view showing a pore size distribution curve in Example 3.
Figure 8:
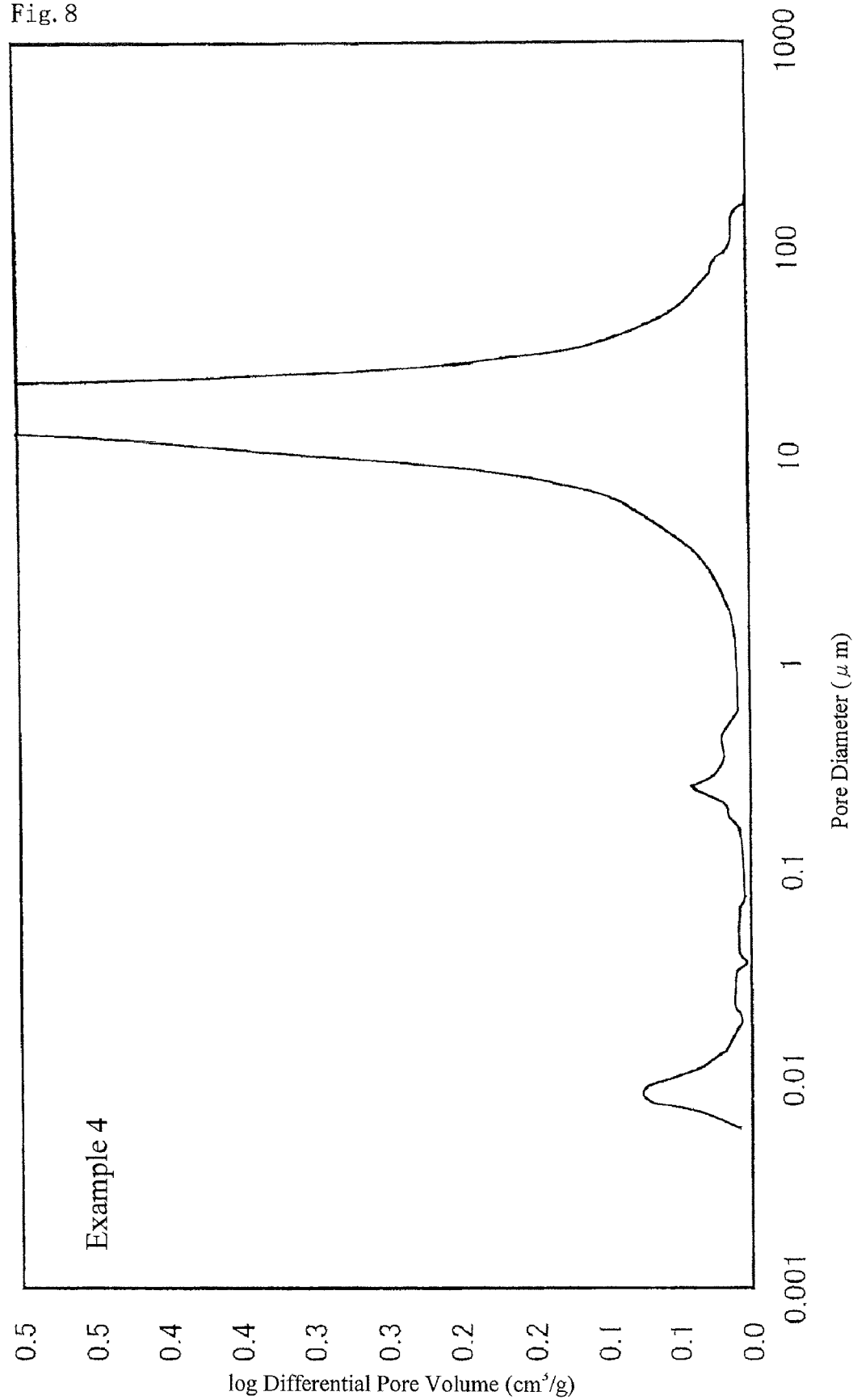
FIG. 8 is a view showing a pore size distribution curve in Example 4.
Figure 9:
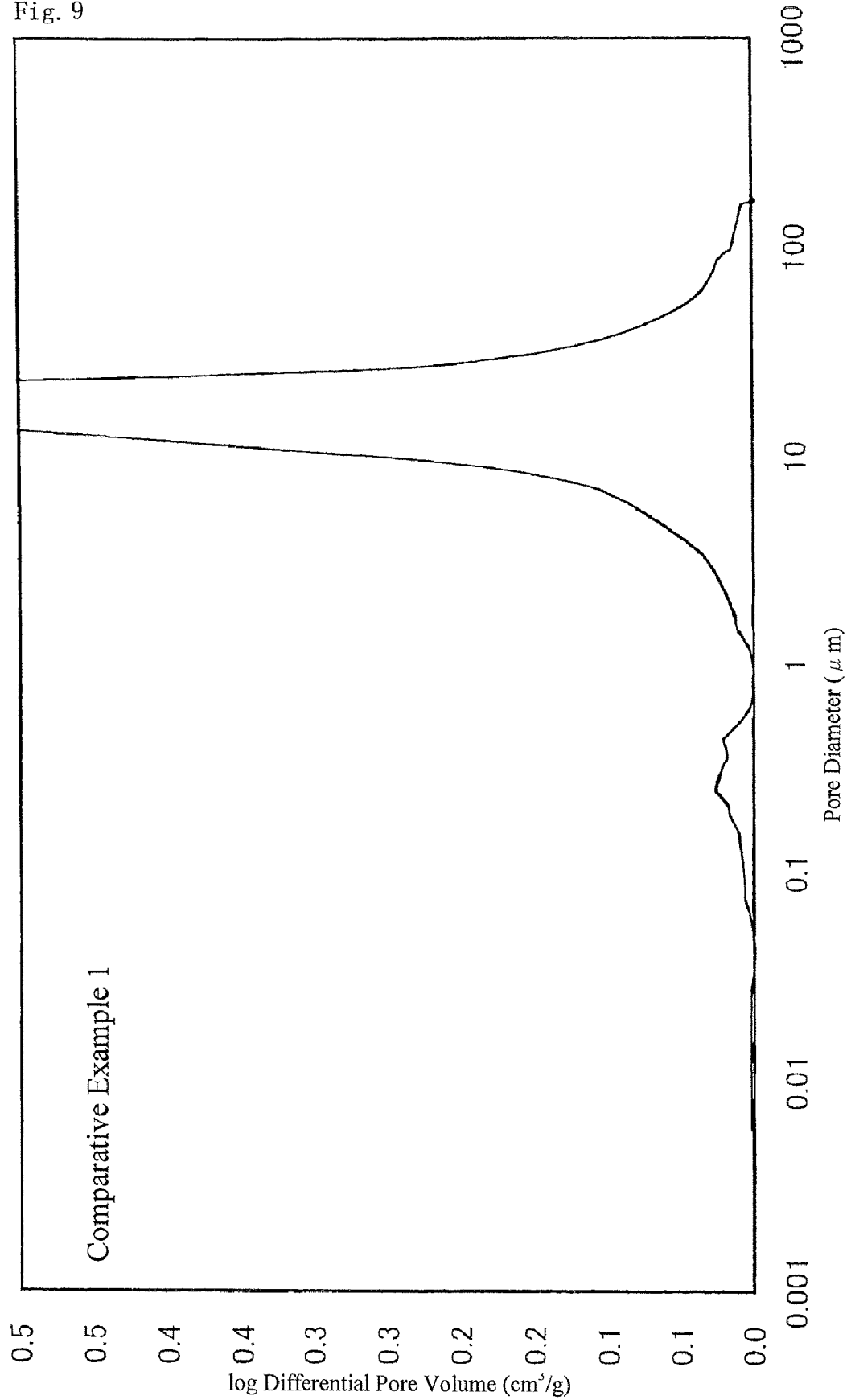
FIG. 9 is a view showing a pore size distribution curve in Comparative Example 1.
Figure 10:
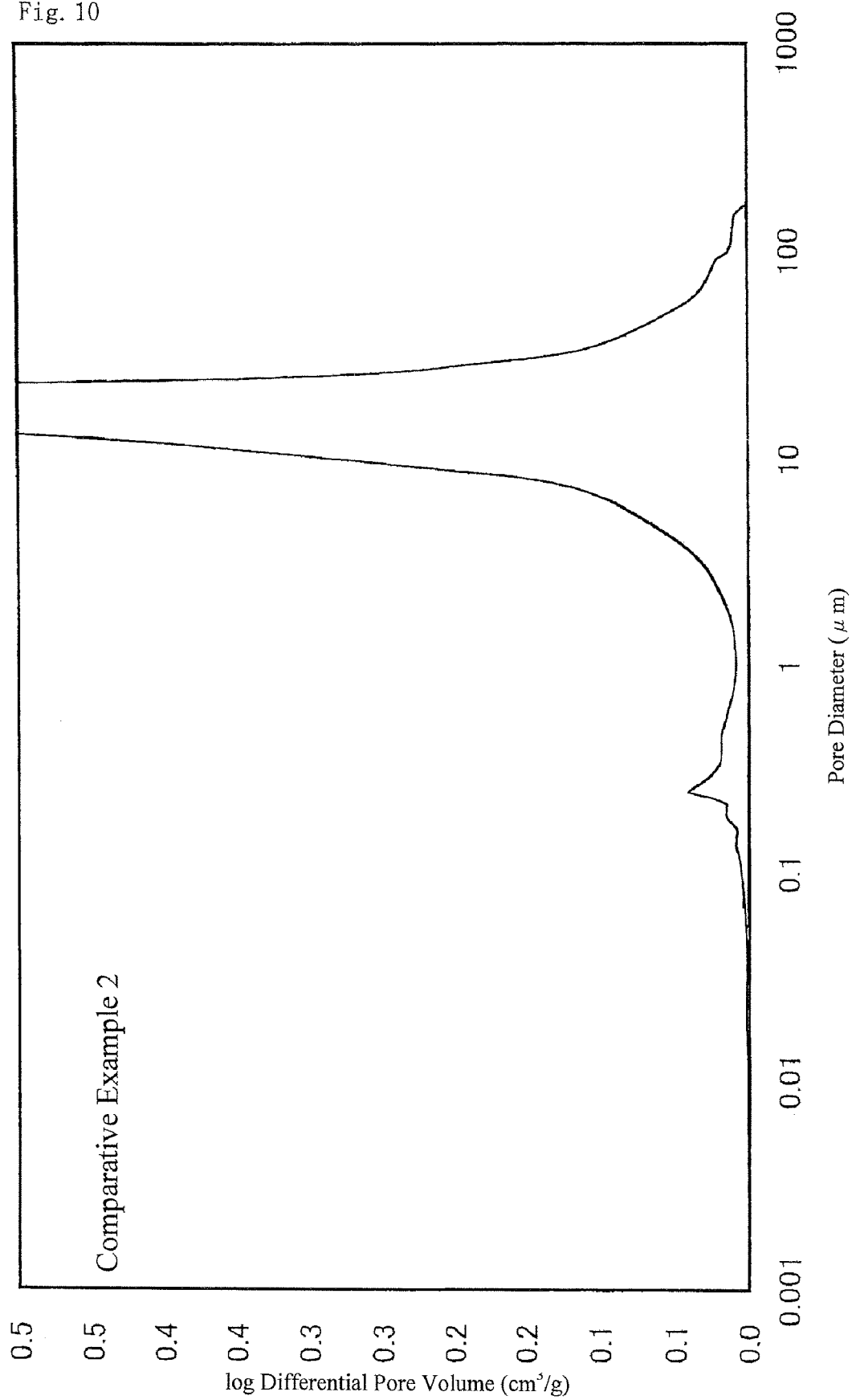
FIG. 10 is a view showing a pore size distribution curve in Comparative Example 2.

As a result of the inventors' knowledge, it has been found that the pore structure of the cell walls made of the ceramic sintered body can more easily simultaneously realize two actions of effective collection of the particulates and effective purification of the exhaust gas in the pore size distribution curve wherein an abscissa is a pore diameter (μm) and an ordinate is a log differential pore volume ($cm^3/g$) as shown in FIG. 4 when one peak (maximum value) of the pore size distribution is existent in first pore group of pores having a pore size ranging from 1.0 μm to about 150 μm and plural peaks of the pore size distribution are existent in the second pore group of pores having a pore size ranging of less than 1.0 μm, preferably two peaks are existent at around 0.01 μm and around 0.3 μm.

Figure 3A:
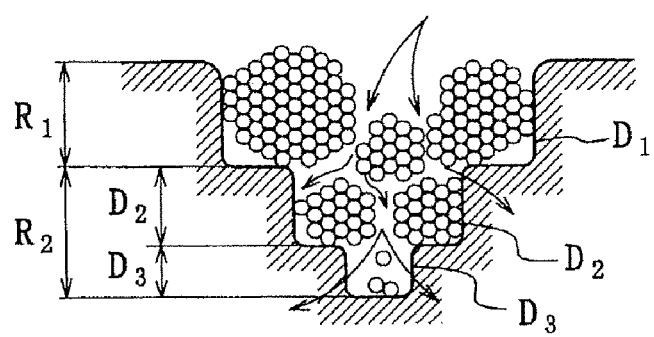
FIGS. 3(a), 3(a)', and 3(a)" are section views schematically illustrating examples of the pore formed in the ceramic honeycomb structural body according to the mode of carrying out the invention
Figure 3A:
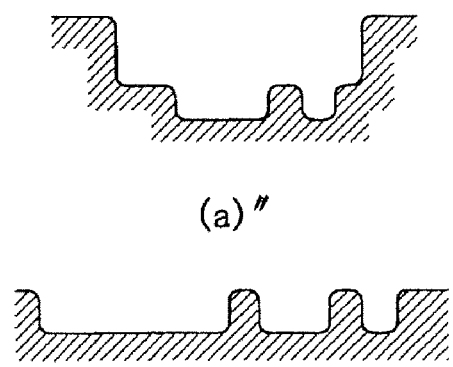

FIG. 3(a) is a schematic view of a typical surface structure in the cell wall of the invention comprising the first pore group and the second pore group having plural peaks (maximum value). In the surface structure shown in this figure, pores having a large pore size $D_1$ belonging to the first group region having a pore size ranging from 1.0 to about 150 μm and pores having a small pore size $D_3$ ranging from about 0.006 or more to less than 0.05 μm and pores having a middle pore size $D_2$ ranging from 0.05 to 1.0 μm belonging to the second group region having a pore size ranging from 0.05 to 1.0 μm are existent three-dimensionally as illustrated in FIG. 3(a). Moreover, the invention is not limited to the illustrated example of FIG. 3(a), and may be constructed so that pores having two different pore diameters are existent in parallel on the same plane as illustrated in FIG. (a)' or three different pore diameters are existent in parallel on the same plane as illustrated in FIG. (a)".

Figure 3B:
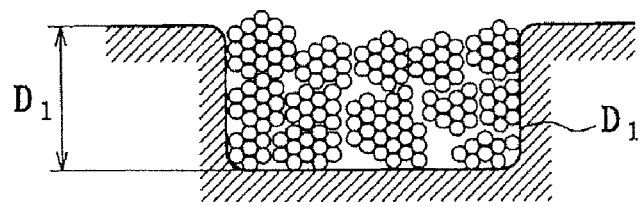
FIGS. 3(b) and 3(c) are section views schematically illustrating the conventional pores.
Figure 3C:
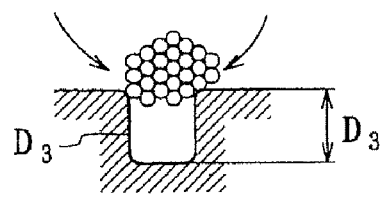

On the other hand, FIGS. 3(b) and 3(c) are schematic views of the surface structure in the conventional cell wall, which show a case that only pores having a large pore size are existent or a case that only pores having a small pore size are existent.

Among these figures, FIG. 3(a) is a case that plural kinds of pores having different pore sizes are further existent in the pores of a so-called large pore size $D_1$. In this case, the pores of the large pore size D1 play a role for collecting the particulates. As pores having such a size (ranging from 1.0 to about 150 μm) are existent, the particulates (aggregate is ranging from about 0.1 to about 10 μm) pass through the walls of the filter and the soot leakage becomes less and the pressure loss can be made low more easily even if the particulates are collected to a certain extent.

The feature of the mode of carrying out the invention lies in that plural pores having a pore size smaller than that of the pores belonging to the first pore group (ranging from 1.0 to about 150 μm) are disposed as the second pore group. That is, when the middle pore size $D_2$ and the small pore size $D_3$ belonging to the second pore group (ranging from about 0.006 or more to less than 1.0 μm) are mixedly existent in addition to the above large pore size, the unevenness is produced on the surfaces of the pores having the large pore size to make the structure of the cell wall surface non-uniform. Therefore, it is considered that the exhaust gas is easily flown randomly and the single particle (ranging from about 0.02 to about 0.7 μm) and secondary particles (aggregated particles, false particles and the like)(ranging from about 0.1 to about 10 μm) are non-uniformly deposited in the multi-layer structure of the above pores $D_1$, $D_2$ and $D_3$ to prevent the particles from rapidly clogging these pores and the pressure loss from increasing. On the contrary, in FIGS. 3(b) and 3(c), there is a problem that the pores are clogged with the aggregated particles having a large pore size or with the pores having a small pore size and that the pressure loss tends to increase.

In this case, in consideration of the catalytic reaction, the particulates as mentioned above are mainly collected in the pores having a large pore size D1 (ranging from 1.0 to about 150 μm), while the pores having a smallest pore size (ranging from about 0.006 to about 0.02 μm) mainly prevent the sintering of the catalyst or can more easily make the preferable range for the uniform dispersion support of the catalyst preferable when the catalyst is supported. It is considered that the pores existing in the medium sized pore region (ranging from about 0.02 to 1.0 μm) enable collection of the particulates with less clogging the smaller pores (ranging from about 0.006 to 0.02 μm) wherein the catalyst is supported and that the exhaust gas is easily flowed so that there is less obstruction to the reaction.

FIG. 4 shows a curve of pore size distribution in the cell wall defined in the invention as measured by a mercury pressure method wherein an abscissa is a pore diameter (μm) and an ordinate is a log differential pore volume (cm³/g). As shown in this figure, the porous ceramic member according to the mode of carrying out the invention has one peak in the first pore group having a pore diameter of about 20 μm and two peaks in total having one peak at around 0.3 μm and another peak around 0.009 μm belonging to the second pore group, which corresponds to an example of the cell wall having the pore structure shown in FIG. 3(a).

That is, according to the mode of carrying out such a ceramic honeycomb structural body, a ceramic honeycomb structural body having a high catalytic reactivity without bringing about the lowering of the particulate collecting efficiency and the increase of the pressure loss is more easily provided.

When the pore size distribution of the pores produced in the cell wall is within the above range, if the exhaust gas passes through spaces among the ceramic particles, the particulates are more easily collected in these spaces because the particulates are constituted with carbon microparticles, sulfur-based microparticles, high molecular weight hydrocarbon microparticles and the like having a particle size ranging from about 20 to about 700 nm. In this point, these particulates are easily aggregated because they are naturally small, and frequently form secondary particles ranging from about 0.1 to about 10 μm (aggregate particles, false particles) through the aggregation. Therefore, these particles deposit on the surface of the cell wall through the pores but also penetrate into the inside of the cell wall from spaces and remain in the spaces. That is, the particulates deposit in the pores inside the cell wall at a compact state, so that the pressure loss tends to be higher. In order to reduce the pressure loss by regeneration, there is a problem the chance of the regeneration reaction becomes less likely because the particles aggregated and less reactive are filled in the pores in the compact state.

In the invention, therefore, it is attempted to improve the surface state (structure) of the ceramic sintered body for the purpose of improving the reactivity in the regeneration. As a result, the ceramic honeycomb structural body having the surface state adjusted as in the mode of carrying out the invention hardly generates the dense filling of the particulates in the pores because the exhaust gas passing through the cell wall forms various flows. Also, when this structural body is used as a filter for the purification of the exhaust gas, since the exhaust gas passing through the filter (cell walls) forms various flows, the exhaust gas is violently flowed in and out, whereby the supply of oxygen and the like is easily conducted and the catalytic reaction easily occurs.

That is, the ceramic sintered body does not show a normal distribution wherein the peak of the pore size distribution is limited to one, but is preferable to have plural peaks. Thus, the pore size distribution having plural peaks means that plural kinds of pores are existent. Particularly, it means that the unevenness is existent in the inner surface of the large pore and also fine pores are formed in the pore at an overlapped state. For example, many particulates are generally existent at the aggregated state and frequently form the secondary particles of ranging from about 0.1 to about 10 μm. In the mode of carrying out the invention, it is particularly preferable to render the pore size distribution into a state that two or more peaks are existent in the region of the second pore group of ranging from about 0.006 or more to less than 1.0 μm. In the cell wall having a structure of such a pore size distribution, it is considered that the collection efficiency is rarely lowered if the numerical values are substantially same.

On the other hand, the cell wall is locally thin in the portion of pore group having a large pore size (ranging from 1.0 to about 150 μm), so that the pressure loss is small and the exhaust gas is easily flowed therein, which makes the gas first flow in this portion. However, the aggregated particulates, concretely relatively small aggregated bodies, large aggregated bodies and aggregated bodies of middle size therebetween are mixedly penetrated into such large pores. In general, the large aggregated bodies are aggregated on the small aggregated bodies, but these aggregated bodies are randomly collected, so that gaps are easily formed in these aggregated bodies. Thus, it is considered that these aggregated bodies of the particulates themselves rarely bring about the lowering of the reactivity because the gas easily flows through the gaps.

As shown in FIGS. 3(a) and (b), the range of easily aggregating the particulates is rendered into a surface state that the pore size distribution has plural peaks, which has an effect in the collection of the particulates. Particularly, small aggregated bodies (or particulate particles) are existent on the each surface of the aggregated particulates with a particle size (ranging from about 20 to about 700 nm) in the region 0.05 μm or less. In such pores, therefore, it is considered that not only the active point of the catalyst tends to increase but also the heat capacity becomes small owing to small particles and that the reaction property of the catalyst is improved.

In this meaning, it is preferable that the pore size distribution includes pores, nearly the microparticle of the particulates.

In the mode of carrying out the invention, even when the above pore size distribution has plural peaks, it is preferable that the range from about 0.006 to about 150 μm is a continuous curve, i.e. the curve of the pore size distribution is continuous without discontinuation or the value of log differential pore volume is not zero but is a positive number. Because, when the pore size distribution is continuous, even if the operation state of the engine is changed to vary the particle size distribution of the particulates, the above effects come to be always obtained easily.

This means that the pore distribution is intentionally made non-uniform by giving a certain variations of the pore size. When the pores have the variations of pore size, the constant collection efficiency and pressure loss are obtained more easily and also the reactivity of the catalyst can be improved.

Moreover, the ceramic honeycomb structural body according to the mode of carrying out the invention is constructed with a pillar-shape ceramic member formed by arranging many cells (through-holes) in parallel through wall portions in the longitudinal direction. Such a porous ceramic member may be formed by combining and bundling a plurality of the porous ceramic member by interposing a sealing material layer (hereinafter referred to as "collective type honeycomb filter") or may be made of one-piece formed ceramic member as a whole (hereinafter referred to as "one-piece type honeycomb filter").

In case of the collective type honeycomb filter, the wall portions are constructed with cell walls made of a porous ceramic member isolating cell for the flow of the exhaust gas and a sealing material layer serving as an adhesive layer joining the porous ceramic members (outer walls) to each other. Therefore, the one-piece type honeycomb filter is constructed with only the cell walls without the sealing material layer.

Figure 2:
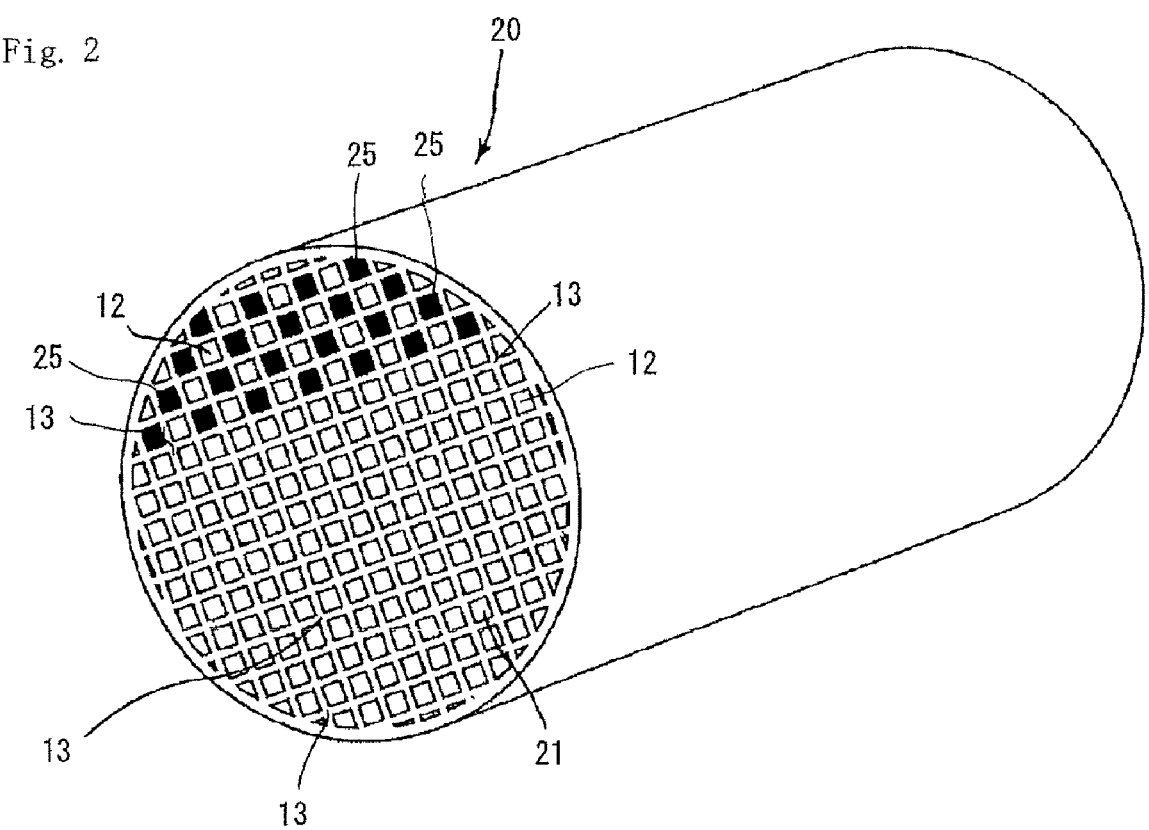
FIG. 2 is a perspective view of a one-piece type honeycomb structural body using porous ceramic members according to the mode of carrying out the invention.

FIG. 1 is a perspective view (note: the outer shape could be different.) illustrating an example of the porous ceramic member of a honeycomb structure (a) and the collective type honeycomb structural body (honeycomb filter)(b) formed by combining and bundling a plurality of these members, and FIG. 2 is a perspective view illustrating a construction of the one-piece type honeycomb filter made from the porous ceramic member shown in FIG. 1(a).

FIG. 1(b) is an example of the ceramic honeycomb structural body according to the mode of carrying out the invention. The ceramic honeycomb structural body 10 is an example of the collective type honeycomb filter formed by bundling a plurality of porous ceramic members 11 by interposing sealing material layers 14 to form a ceramic block and forming a sealing material layer 16 for preventing the leakage of the exhaust gas around the ceramic block.

The porous ceramic member 11 is constituted by arranging many cells 12 as a path for the exhaust gas in parallel in the longitudinal direction, wherein end portions at either inlet side or outlet side of the cells 12 are sealed with a sealing material (plug) 15, 25 and the cell wall 13 partitioning the cells 12 serves as a filter.

When the collective type ceramic honeycomb structural body 10 having such a construction is disposed in an exhaust path of an internal combustion engine such as a diesel engine as a honeycomb filter for the purification of the exhaust gas, particulates of the exhaust gas discharged from the internal combustion engine are collected by the cell walls 13 in the passing through the ceramic honeycomb filter 10 to conduct the purification of the exhaust gas.

The shape of the ceramic honeycomb filter 10 shown in FIG. 1 (b) is cylindrical shape, but it is not limited to the cylindrical shape and may be, for example, an optional shape such as cylindroid shape and rectangular pillar shape.

In the ceramic honeycomb filter according to the mode of carrying out the invention, the material of the porous ceramic member is not particularly limited, and may include, for example, nitride ceramics such as aluminum nitride, silicon nitride, boron nitride and titanium nitride; carbide ceramics such as silicon carbide, zirconium carbide, titanium carbide, tantalum carbide and tungsten carbide; oxide ceramics such as alumina, zirconia, cordierite, mullite and aluminum titanate. Among them, silicon carbide is preferable because the heat resistance is large and the mechanical properties are excellent and the thermal conductivity is large. Moreover, silicon-containing ceramic formed by blending the above ceramic with metallic silicon, ceramic bonded with silicon or silicate blend may be used. In addition, the silicon carbide ceramic is mainly composed of silicon carbide (about 60 wt % or more), and may be constituted with only silicon carbide but also may be formed by bonding silicon carbide with a metal or a crystalline or amorphous blend.

Such a porous ceramic member is preferable to have a porosity of ranging from about 20 to about 80%, more preferably ranging from about 50 to about 70%. When the porosity is about 20% or more, the clogging of the ceramic filter becomes rarely caused, while when the porosity is about 80% or less, the strength of the porous ceramic member is hardly lowered, which makes the breakage less likely. Particularly, when the catalyst coat layer is supported, the pressure loss becomes large, so that it is desirably ranging from about 50 to about 70%.

Moreover, the porosity can be measured, for example, by the conventionally known method such as a mercury pressure method, an Archimedes method, measurement through a scanning electron microscope (SEM).

Also, the average pore size of the porous ceramic member 11 is desirably ranging from about 5 to about 100 µm. When the average pore size is about 5 µm or more, the clogging is hardly caused by the particulates. On the contrary, when the average pore size is about 100 µm or less, the particulates hardly pass through the pores and hence its collection becomes easier and the function as the filter can be certainly developed.

The particle size of the ceramic used in the production of the porous ceramic member 11 is not particularly limited, but it is desirable that the shrinkage in the firing is less. For example, it is desirable to blend 100 parts by weight of powder having an average particle size ranging from about 0.3 to about 50 µm with from about 5 to about 65 parts by weight of powder having an average particle size ranging from about 0.1 to about 1.0 µm. Because the preferable porous ceramic member becomes more easily produced by mixing ceramic powders having the above particle sizes at the above blending ratio.

Since the ceramic honeycomb filter 10 and 20 of the mode of carrying out the invention are used as filters for collecting and removing the particulates in the exhaust gas, it has a structure that either one end portion of the cells 12 are sealed. The sealing member 15 is desirably made from the porous ceramic member 11. The adhesiveness between both the members tends to be improved by using the sealing member 15 made of the same material as in the main body of the porous ceramic member. Also, the pore size of the sealing member 15 is adjusted to the same as in the main body of the porous ceramic member 11, whereby the thermal expansion coefficient of the sealing member 15 can be more easily matched with the thermal expansion coefficient of the porous ceramic member 11, and hence the gap is rarely made between the sealing member 15 and the cell wall 13 or there is rarely cracking in the sealing member 15 or the cell wall 13 contacting with the sealing member 15 due to thermal stress in the production or the use. Moreover, the sealing member 15 can be formed by filling a slurry of desired ceramic powder. Also, it is possible to form the sealing member 15 by mounting the previously prepared sealing piece.

In the ceramic honeycomb filter 10 and 20 according to the mode of carrying out the invention, the sealing material layer is disposed on an outer periphery of the ceramic block in addition to between the mutual porous ceramic members 11. The sealing material layer 14 interposed between the porous ceramic members 11 also functions as an adhesive bundling the porous ceramic members 11 with each other, while the sealing material layer 16 formed on the outer periphery of the ceramic block functions as a sealing member for preventing the leakage of the exhaust gas between the outer periphery of the ceramic block and the casing when the ceramic honeycomb filter 10 and 20 according to the mode of carrying out the invention are disposed in the exhaust path of the internal combustion engine.

As the material constituting the sealing material layer 14 and 16, for example, an inorganic binder, an organic binder, inorganic fibers and/or inorganic particles, or the like can be used. As mentioned above, these sealing material layers 14 and 16 are formed between the porous ceramic members but also on the outer periphery of the ceramic block, the materials for these sealing material layers 14 and 16 may be same or different. Moreover, when the sealing material layers 14 and 16 are made from the same material, the blending ratio of the material may be same or different.

As the inorganic bonder, for example, silica sol, alumina sol or the like may be used. They may be used alone or in a combination of two or more. Among the above inorganic binders, silica sol is desirable.

As the organic binder, for example, polyvinyl alcohol, methyl cellulose, ethyl cellulose, carboxymethyl cellulose or the like may be used. They may be used alone or in a combination of two or more. Among the above organic binders, carboxymethyl cellulose is desirable.

As the inorganic fibers, ceramic fibers of alumina, silica, silica-alumina, glass, potassium titanate, aluminum borate or the like, whiskers of alumina, silica, zirconia, titania, ceria, mullite, silicon carbide or the like can be recommended. They may be used alone or in a combination of two or more. Among the above inorganic fibers, alumina fiber is desirable.

As the inorganic particles, for example, carbides, nitrides or the like may be used. Concretely, inorganic powders of silicon carbide, silicon nitride, boron nitride or the like can be used. They may be used alone or in a combination of two or more. Among the above inorganic particles, silicon carbide having an excellent thermal conductivity is desirable.

The sealing material layer 14 may be made of a dense body or may be made of a porous body capable of flowing the exhaust gas thereinto. However, the sealing material layer 16 is desirable to be made of a dense body. Because, when the ceramic honeycomb filter 10 and 20 according to the invention is disposed in the exhaust path of the internal combustion engine, the sealing material layer 16 is used for the purpose of preventing the leakage of the exhaust gas from the outer periphery of the ceramic block.

FIG. 2 is a perspective view illustrating a concrete example of the one-piece type honeycomb filter as another example of the ceramic honeycomb filter according to the mode of carrying out the invention.

As shown in FIG. 2, the one-piece type ceramic honeycomb filter 20 is constructed with a pillar-shape porous ceramic member in which many cells 12 are arranged in parallel through the cell walls 13 in the longitudinal direction. In the pillar-shape porous ceramic member, the end portions of the cells 12 at either inlet side or outlet side for the exhaust gas are sealed with the sealing members 15, and the cell walls 13 separating these cells 12 serve as a filter.

This kind of the one-piece type honeycomb filter 20 is integrally produced by an extrusion molding method of the porous ceramic member and is fundamentally constructed likewise the above collective type honeycomb filter 10. Therefore, the exhaust gas flowed into the filter 20 is discharged after the passing through the cell wall 13 separating the cells 12 from each other.

The porous ceramic member constituting the ceramic honeycomb filter 20 as an aggregate of the above units can be, for example, an oxide ceramic such as cordierite, alumina, silica, mullite or aluminum titanate; a carbide ceramic such as silicon carbide, zirconium carbide, titanium carbide, tantalum carbide or tungsten carbide; and a nitride ceramic such as aluminum nitride, silicon nitride, boron nitride or titanium nitride. Among them, the oxide ceramic such as cordierite or the like is a preferable material because it is cheap and relatively small in the thermal expansion coefficient and is not oxidized in the use.

The size of the ceramic honeycomb filter 20 is properly determined by considering the size of the exhaust path of the internal combustion engine used or the like. Also, the shape thereof may be an optional shape such as cylindrical, cylindroid or rectangular pillar as far as it is pillar-shape. Particularly, it is preferable to be cylindrical shape as shown in FIG. 2.

In such a one-piece type ceramic honeycomb filter 20, the porosity of the pillar-shape porous ceramic member is preferably ranging from about 20 to about 80%, more preferably ranging from about 50 to about 70%. The reason on this limitation is as previously mentioned.

The average pore size of the porous ceramic block is desirably from about 5 to about 100 μm. The reason on such a limitation of the average pore size is as previously mentioned.

The sealing members 15 in such ceramic honeycomb filters 10 and 20 are desirably made from the porous ceramic. When the sealing members 15 are made from the same porous ceramic as in the porous ceramic block, the adhesion strength of the both tends to be increased, while by adjusting the porosity of the sealing members 15, the thermal expansion coefficient of the sealing member can be more easily matched with the thermal expansion coefficient of the porous ceramic block. As a result, the occurrence of the gap between the sealing member 15 and the cell wall 13 or the cracking of the sealing member 15 or the portion of the cell wall 13 contacting with the sealing member 15 due to the thermal stress in the production or the use can be more easily prevented.

When the sealing member 12 is made from the porous ceramic, the same material as in the ceramic material constituting the porous ceramic block as previously mentioned can be used. Moreover, the sealing member can be formed by filling the slurry of the ceramic powder or the sealing member may be obtained by joining the previously prepared sealing pieces.

In the ceramic honeycomb filters of the mode of carrying out the invention shown in FIGS. 1 (b) and 2, the form of section perpendicular to the longitudinal direction of the cell (hereinafter referred to as section simply) is desirable to be polygonal. For example, the section may be polygonal such as square, hexagonal, trapezoidal or octahedral and may be a mixed form thereof.

Next, an example of the production method of the ceramic honeycomb filter according to the mode of carrying out the invention will be described.

When the structure in the ceramic honeycomb filter of the mode of carrying out the invention is the one-piece type honeycomb filter shown in FIG. 2, a ceramic raw molded body having substantially the same shape as in the ceramic honeycomb filter 20 shown in FIG. 2 is first produced by extrusion-molding a raw material paste composed mainly of ceramic as previously mentioned.

In the above extrusion molding, the raw material paste can be continuously extruded through a metal dies disposed in a top portion of the extrusion molding machine and provided with many small holes and cut into a given length, whereby the ceramic raw molded body can be produced. Particularly, it is desirable that the particle size of the taw material is first adjusted so as to place the small holes at the range from 1.0 to about 150 μm in order to produce the honeycomb structural body of the invention.

In order that one peak is existent in the range of the first pore group of pore sizes ranging from 1.0 to about 150 μm and further peaks appear in the range of second group of pore sizes ranging from about 0.006 or more to less than 0.05 μm and in the range of pore sizes ranging from 0.05 to less than 1.0 μm in the pore distribution curve, the mix-blending of the raw material particles is carried out by changing the particle size of the substrate for the honeycomb structural body, or by changing conditions of solution adjustment (pH, temperature) such as sol-gel method, drying, calcining and so on, in order to coat the surface of the substrate with microparticles and to change the particle size of such microparticles, or by changing the particle size of the microparticles through pulverization.

Also, the pores according to the mode of carrying out the invention are possible to be prepared by adjusting an aspect ratio of a pore forming agent having a pore-forming property. Moreover, the pores can be formed by adjusting the viscosity of the raw material paste, particle size of each material, blending ratio and the like.

The raw material paste is not particularly limited as far as the porosity of the porous ceramic member after the production is made from about 20 to about 80 mass %, and can be obtained by adding a binder and a dispersion medium to the powder of the above ceramic.

As the binder, for example, methylcellulose, carboxymethyl cellulose, hydroxyethyl cellulose, polyethylene glycol, or the like may be used. The amount of the binder blended is desirable to be ranging from about 1 to about 10 parts by weight based on 100 parts by weight of the ceramic powder.

As the dispersion medium, for example, an organic solvent such as benzene, an alcohol such as methanol, or water can be used. The dispersion medium is properly blended so that the viscosity of the raw material paste is within a certain range.

These ceramic powder, binder and dispersion medium are mixed in an attriter or the like, sufficiently kneaded in a kneader or the like and then extrusion-molded to produce the above ceramic raw molded body.

To the raw paste may be added a molding assist, if necessary. As the molding assist, for example, ethylene glycol, dextrin, fatty acid, fatty acid soap, polyalcohol or the like can be used.

Further, a pore-forming agent such as balloons being micro hollow spherical bodies composed of the oxide ceramic, spherical acryl particles, graphite or the like, may be added to the raw material paste, if necessary. As the balloon, for example, alumina balloon, glass microballoon, silas balloon, fly ash balloon (FA balloon), mullite balloon or the like may be used. Among them, fly ash balloon is desirable.

Then, the ceramic raw molded body is dried by using a microwave dryer, a hot air dryer, a dielectric dryer, a dryer under a reduced pressure, a vacuum dryer, a freezing dryer or the like, and thereafter subjected to a sealing treatment for plugging the through-holes by filling a sealing material paste as a sealing member for predetermined through-holes.

As the sealing material paste, the same material as the raw material paste can be used as far as the porosity of the sealing member is ranging from about 20 to about 80%. The sealing material paste is preferable to be obtained by adding a lubricant, a solvent, a dispersant and a binder to the ceramic powder used in the raw material paste. The reason is because the settling of the ceramic particles in the sealing material paste can be more easily prevented during the process of the sealing treatment.

Next, the ceramic dried body filled with the sealing material paste is degreased and fired under predetermined conditions, whereby there can be produced a filter comprising the porous ceramic in which the whole thereof is constituted with one sintered body.

When the structure of the ceramic honeycomb filter of the mode of carrying out the invention is a collective type filter constructed to bundle a plurality of the porous ceramic members by interposing the sealing material layer as shown in FIG. 1(b), the raw material paste composed mainly of the aforementioned ceramic is extrusion-molded to produce a raw molded body of a shape as in the porous ceramic member shown in FIG. 1(a).

Moreover, as the raw material paste, the same raw material paste as described in the above one-piece type honeycomb filter can be used.

Next, the raw molded body is dried with a microwave dryer or the like to obtain a dried body, and subjected to a sealing treatment for plugging the through-holes by pouring a sealing material paste into through-holes formed in the dried body as a sealing member. Furthermore, as the sealing paste, the same sealing paste as described in the above one-piece type honeycomb filter can be used, and as the sealing treatment, the same method as in the case of the above one-piece filter can be adopted except that the target to be filled with the sealing material paste is different.

The dried body after the sealing treatment is degreased and fired under predetermined conditions, whereby there can be produced a porous ceramic member in which plural through-holes are arranged in parallel through the partition walls in the longitudinal direction. The same method as in the case of the above one-piece filter can be also adopted in this case.

Next, the sealing material paste as a sealing material layer 14 is applied at a constant thickness and the other ceramic member 11 is laminated, and such steps are repeated to produce a laminate of the rectangular pillar porous ceramic members 11 having a given thickness. Moreover, the material constituting the sealing material paste is as mentioned in the aforementioned filter of the invention and is omitted there.

Next, the laminate of the porous ceramic members 11 is heated to dry and solidify the sealing material paste layer to form a sealing material layer 14, which is then cut into a form of its outer periphery as shown in FIG. 1 (b) with a diamond cutter or the like to produce a ceramic block.

On the outer periphery of the resulting ceramic block is formed a sealing material layer 14 by using the above sealing material paste, whereby there can be produced a collective type ceramic filter formed by bundling the plurality of the porous ceramic members 11.

All of the thus produced ceramic filters are pillar-shape, and the structures thereof are as shown in FIGS. 1 (b) and 2. Also, as a greater amount of the particulates are deposited onto the cell walls of the filter to increase the pressure loss, the filter is subjected to a regeneration treatment.

In the regeneration treatment, the particulates deposited on the wall portion (cell wall) may be burnt and removed by raising the exhaust gas temperature with a post injection system and flowing the heated gas into interiors of the through-holes in the filter to heat the filter, or a heater, a heating means such as an oxidation heat of another oxidation catalyst may be naturally used.

The ceramic honeycomb structural body according to the mode of carrying out the invention serves as a filter for collecting the particulates in the exhaust gas when the catalyst is supported on the surface of the cell wall or the surface of each ceramic particles in the inside thereof to form a ceramic honeycomb filter, but also serves as a catalyst carrier for removing and converting harmful gas components included in the exhaust gas such as CO, HC and NOx.

The catalyst may be any catalysts capable of converting CO, HC, NOx and the like in the exhaust gas, which can use a noble metal such as platinum, palladium or rhodium. In addition to the noble metal, an alkali metal (Group 1 I the Periodic Table), an alkaline earth metal (Group 2 in the periodic Table), a rare earth element (Group 3 in the Periodic Table), a transition metal element or the like may be added.

In the ceramic honeycomb filter according to the mode of carrying out the invention, it is important that plural peaks in the pore size distribution are existent at the fine particle side (ranging from about 0.006 or more to less than 1.0 µm) as mentioned above. In this case, when an oxide based support material such as alumina, zirconia, titania or silica is formed on the surface of the cell wall in the ceramic honeycomb filter, the peak of the pore size distribution can be also controlled by adjusting the particle size of the support material. Moreover, the catalyst is preferably carried on the surface of each particle in the support material.

In the invention, as the preferable embodiment of the catalyst and support material, platinum as a catalyst and alumina particles is preferably used as the support material. Next, the method of forming a catalyst coat layer comprising the catalyst and support material is explained.

Firstly, as the method of preparing a solution, the support material is finely pulverized by a grinding machine or the like and the resulting support material powder is stirred to be mixed with a solvent to prepare a slurry liquid. Concretely, oxide powder such as γ-alumina is first prepared by a sol-gel method. In this case, powder having various particle sizes may be previously prepared by controlling pH, temperature, drying condition and the like. Moreover, since the alumina powder is used as a coat layer for the catalyst, powder having a specific surface area as large as possible is preferable, and therefore particles having a high specific surface area about 250 m$^2$/g or more is used. Particularly, γ-alumina is preferable owing to the large specific surface area.

Then, the oxide powder (alumina) is added with an inorganic binder such as hydrated alumina, alumina sol or silica sol or an amount ranging from about 5 to about 20 wt % of solvent such as pure water, water, alcohol, diol, polyvalent alcohol, ethylene glycol, ethylene oxide, triethanol amine or xylene is added and pulverized until the size becomes about 500 nm or less and stirred. By such a fine pulverization, alumina film on the surface of the each particle constituting the cell wall of the ceramic member can be more easily uniformly formed, which is different from the case that the wash coat is coated onto the surface layer of the cell wall in the conventional technique. In this case, alumina having plural kinds of particle sizes is formed by changing the pulverizing time or the like.

Then, the solution containing the above oxide powder is impregnated into a ceramic honeycomb filter of γ-alumina or the like. This is dried by heating at the range from about 110 to about 200° C. for about 2 hours and fired. The preferable firing temperature is ranging from about 500 to about 1000° C., and the treatment is carried out for about 1 to about 20 hours. The reason on this temperature range is based on the fact that when it is about 500° C. or more, the strength after the fixation of the oxide powder hardly becomes low, while when it is about 1000° C. or less, the crystallization is not too much promoted and the specific surface area hardly tends to be lowered. Also, the carried amount can be calculated by measuring the weight before and after such steps.

Moreover, prior to the impregnation of the oxide (alumina), a treatment for improving the wettability can be also applied to the surface of each particle in the cell wall of the ceramic member. For example, the wettability to a catalyst solution is improved by modifying the surfaces of silicon carbide particles constituting the cell wall body with HF solution, and hence the surface roughness after the support of the catalyst becomes high more easily.

Then, platinum is carried on the surface of the filter. This carrying treatment may be a treatment wherein the platinum containing solution is added by drop of only an amount corresponding to water absorbed with the ceramic member through a pipette and dried at about 110° C. for about 2 hours and dried in a nitrogen atmosphere at about 500 to about 1000° C. to conduct metallization.

The ceramic honeycomb structural body according to the mode of carrying out the invention can be preferably used in the fields of the exhaust gas purifying filter for the internal combustion engine, particularly a filter for removing particulates and the like in the exhaust gas discharged from a diesel engine, a catalyst carrier for removing harmful components such as NOx in the exhaust gas, and so on.

EXAMPLES

The invention is further explained in detail with reference to the following examples, but is not intended as limitations thereof.

Example 1

This example is conducted for confirming the action and effect when ceramic members comprising silicon carbide are produced by changing pore size and pore size distribution and a catalyst coat layer of platinum-containing alumina is formed on the surface thereof. The production methods in Examples 1 to 4 and Comparative Examples 1 and 2 are summarized in Table 1. Moreover, the production method of the ceramic member is as follows.

At first, 70 wt % of silicon carbide coarse powder having an average particle size of 10 µm (as "powder A") is mixed with 30 wt % of silicon carbide fine powder having an average particle size of 0.3 µm (as "powder B") as a starting material. Next, acryl particles having an average particle size of 10 µm (density: 1.1 g/cm$^3$) (as "powder C") is mixed with the silicon carbide mixed powder by an amount of 3 vol % of that mixed power A and B.

100 parts by weight of the thus adjusted silicon carbide mixed starting powder is added and mixed with 10 parts by weight of methylcellulose as a molding assist. Further, the methylcellulose-containing mixed powder is added and kneaded with 18 parts by weight of a dispersion medium comprising of an organic solvent and water. Finally, the mixture of all components is extrusion-molded by using a die so as to take a target honeycomb shape, whereby a honeycomb molded body having many through-holes (cells) is produced, and either end portions of the through-holes (cells) are sealed in a checkered pattern to obtain a raw molded body.

Then, the raw molded body is dried at 150° C., degreased at 500° C. and then fired in an inert gas atmosphere at 2200°

C. to obtain a sample of a ceramic member comprising a silicon carbide sintered body having a size of 34.3 mm×34.3 mm×150 mm and 300 cells/in² (Sample No. 1 to 6).

These samples (No. 1 to 6) are immersed in 0.1% HF solution for 1 minute.

Then, in order to give plural pore size distributions adaptable for the invention, 60 g/L of alumina coat and 2 g/L of Pt are supported on the sample by using alumina having a particle size shown in Table 1. Particularly, the particle size of alumina is made uniform by changing the concentration in the sol-gel method, pH, a surfactant and the like and changing the particle size.

With respect to these samples, the pore diameter is measured by a mercury pressure method (according to JIS R 1655 (2003)).

Concretely, the ceramic member of the honeycomb structure is cut into a cubic body of about 0.8 cm, ultrasonic washed with an ion exchanged water and sufficiently dried. The measurement of the sample is carried out by using a micromeritecs autoporosimeter AutoPore III9405 made by Shimadzu Corporation. In this case, the measuring range is from 0.006 to 500 µm, wherein the range from 100 to 500 µm is measured by each pressure of 0.1 psia and the range from 0.006 to 100 µm is measured by each pressure of 0.25 psia.

As a result, some maximum values are existent in the pore size distribution. The numerical values thereof are shown in Table 1. The concrete measured data are shown in FIG. 5 to 10.

Then, a gas containing particles of 0.05 nm are passes through the each sample at a section flow rate of 5 m/s, during which the filtration efficiency is measured to determine the collection efficiency. The results are also shown in Table 1.

As seen from these results, the collection efficiency on microparticles of 0.05 nm is clearly higher in the examples having a pore size of about 0.05 µm.

Next, 16 units of above each sample are prepared, and the same kind of these samples are bundled with each other using a sealing material paste and cut into a cylindrical ceramic block with a diamond cutter, and further sealing material paste is applied onto an outer periphery of the ceramic block to form a sealing material layer, whereby a collective type ceramic honeycomb filter is produced. Concrete sealing material paste is used as follows.

That is, a heat-resistant sealing material paste comprising 30 wt % of alumina fibers having an average fiber length of 0.2 mm, 21 wt % of silicon carbide particles having an average particle size of 0.6 µm, 16 wt % of silica sol, 5.6 wt % of carboxymethyl cellulose and 27.4 wt % of water is interposed between the ceramic members (units) to combine them, and the outer peripheral portion thereof is cut into a cylindrical shape with the diamond cutter. Thus, there is produced a cylindrical ceramic block having a diameter of 144 mm and a length of 150 mm. In this case, the thickness of the sealing material layer bundling the ceramic members (samples) is 1.0 mm.

A heat-resistant sealing material paste comprising 23.3 wt % of alumina silicate fibers having an average fiber length of 0.1 mm and a shot content of 3%, 30.2 wt % of silicon carbide particles having an average particle size of 0.3 µm, 7 wt % of silica sol (solid content: 30% by weight), 0.5 wt % of carboxymethyl cellulose and 39 wt % of water is applied onto the outer peripheral portion of the ceramic block so as to render the thickness of the sealing material layer into 1.0 mm and dried at 120° C. to produce a columnar filter for the purification of the exhaust gas.

A regeneration experiment after the collection of 6 g/L is conducted using such a filter for the purification of the exhaust gas.

As shown from the results in Table 1, the collection efficiency and regeneration ratio on particles of 0.05 µm become higher when the region of the second pore group has plural peaks as is adaptable for the invention (Sample No. 1 to 4). Further, the better results are shown in the case when the pore size distribution is continuous over the whole pore size range (Sample No. 4) than those in the case when it is discontinuous (Sample No. 1).

| | | | Particle Size of Alumina Material | | | | | | | State of Pore Size Distribution |
|---|---|---|---|---|---|---|---|---|---|---|
| Example | 1 | Sample 1 | 0.01 µm | 50 wt % | | | 0.2 µm | 50 wt % | | Peak of 0.006-0.02 µm |
| | 2 | Sample 2 | 0.01 µm | 25 wt % | 0.035 µm | 25 wt % | 0.2 µm | 50 wt % | | Peak of 0.006-0.02 µm |
| | 3 | Sample 3 | 0.01 µm | 25 wt % | 0.035 µm | 25 wt % | 0.2 µm | 25 wt % | 0.8 µm 25 wt % | Peak of 0.006-0.02 µm |
| | 4 | Sample 4 | 0.01 µm | 45 wt % | 0.035 µm | 5 wt % | 0.2 µm | 45 wt % | 0.8 µm 5 wt % | Peak of 0.006-0.02 µm |
| Comparative Example | 1 | Sample 5 | | | | | 0.2 µm | 100 wt % | | |
| | 2 | Sample 6 | | | | | 0.2 µm | 95 wt % | 0.8 µm 5 wt % | |

| | | | State of Pore Size Distribution | | | | Collection Efficiency (0.05 µm) | Regeneration Ratio (8 g/L) |
|---|---|---|---|---|---|---|---|---|
| Example | 1 | Sample 1 | None (Discontinuous) | Peak of 0.05-0.5 µm | None (Discontinuous) | Peak of 1.0-30 µm | 70% | 80% |
| | 2 | Sample 2 | Peak of 0.02-0.05 µm | Peak of 0.05-0.5 µm | None (Discontinuous) | Peak of 1.0-30 µm | 95% | 90% |
| | 3 | Sample 3 | Peak of 0.02-0.05 µm | Peak of 0.05-0.5 µm | Peak of 0.5-1.0 µm | Peak of 1.0-30 µm | 95% | 95% |
| | 4 | Sample 4 | Presence (Continuous) | Peak of 0.05-0.5 µm | Presence (Continuous) | Peak of 1.0-30 µm | 85% | 88% |

-continued

|  |  |  |  |  |  |  |  |
|---|---|---|---|---|---|---|---|
| Comparative Example | 1 | Sample 5 | Peak of 0.05-0.5 μm | None (Discontinuous) | Peak of 1.0-30 μm | 30% | 60% |
|  | 2 | Sample 6 | Peak of 0.05-0.5 μm | Presence (Continuous) | Peak of 1.0-30 μm | 30% | 65% |

Example 2

This example is conducted for confirming the action and effect when ceramic members of silicon-silicon carbide composite are produced by changing pore size, pore size distribution and surface roughness and a catalyst coat layer of platinum-containing alumina is formed on the surface thereof. The production methods in Examples 5 to 8 and Comparative Examples 3 and 4 are summarized in Table 2. Moreover, the production method of the ceramic member is as follows.

Firstly, 70% by weight of metallic silicon powder having an average particle size of 30 μm (as "powder A") is mixed with 30% by weight of silicon carbide powder having an average particle size of 1 μm (as "powder B") as a starting material. Next, acryl particles having an average particle size of 10 μm (density: 1.1 g/cm$^3$) (as "powder C") is mixed with the mixed powder by an amount of 3 vol % of that mixed power A and B.

100 parts by weight of the acryl particles-containing mixed starting powder is added and mixed with 10 parts by weight of methylcellulose as a molding assist. Further, the mixed powder is added and kneaded with 18 parts by weight of a dispersion medium comprising an organic solvent and water. Finally, the kneaded mixture is extrusion-molded by using a die so as to take a target honeycomb shape, whereby a honeycomb molded body having many through-holes (cells) is produced, and either end portions of the through-holes (cells) are sealed in a checkered pattern to obtain a raw molded body.

Then, the raw molded body is dried at 150° C., degreased at 500° C. and then fired in an inert gas atmosphere at 1500° C. to obtain a sample of a ceramic member comprising a silicon-silicon carbide composite having a size of 34.3 mm×34.3 mm×150 mm and 300 cells/in$^2$ (Sample No. 7 to 12).

These samples (Sample No. 7 to 12) are immersed in 0.1% HF solution for 1 minute.

Then, in order to give plural pore size distributions adaptable for the invention, 60 g/L of alumina coat and 2 g/L of Pt are supported on the sample by using alumina having a particle size shown in Table 2 likewise Example 1.

With respect to these samples, the pore diameter is measured by a mercury pressure method (according to JIS R 1655 (2003)). As a result, plural maximum values are existent in the pore size distribution. The numerical values thereof are shown in Table 2.

Then, a gas containing particles of 0.05 nm is made flow through the each sample at a section flow rate of 5 m/s, while the filtration efficiency is measured to determine the collection efficiency. The results are also shown in Table 2.

As seen from these results, the collection efficiency on microparticles of 0.05 nm is clearly higher in Examples 5 to 8 than those of Comparative Examples 3 and 4 wherein the region of the second pore group has a pore size distribution having peaks in the range from 0.006 to 0.02 μm and in the range from 0.05 to 0.5 μm.

A regeneration experiment after the collection of 6 g/L is conducted by bundling each of the samples (No. 7 to 12) as in Example 1. As shown from the results in Table 2, the regeneration ratio becomes higher in the case when the plural peaks are existent.

|  |  |  | Particle Size of Alumina Material |  |  |  |  |  |  | State of Pore Size Distribution |
|---|---|---|---|---|---|---|---|---|---|---|---|
| Example | 5 | Sample 7 | 0.01 μm | 50 wt % |  |  | 0.2 μm | 50 wt % |  |  | Peak of 0.006-0.02 μm |
|  | 6 | Sample 8 | 0.01 μm | 25 wt % | 0.035 μm | 25 wt % | 0.2 μm | 50 wt % |  |  | Peak of 0.006-0.02 μm |
|  | 7 | Sample 9 | 0.01 μm | 25 wt % | 0.035 μm | 25 wt % | 0.2 μm | 25 wt % | 0.8 μm | 25 wt % | Peak of 0.006-0.02 μm |
|  | 8 | Sample 10 | 0.01 μm | 45 wt % | 0.035 μm | 5 wt % | 0.2 μm | 45 wt % | 0.8 μm | 5 wt % | Peak of 0.006-0.02 μm |
| Comparative Example | 3 | Sample 11 |  |  |  |  | 0.2 μm | 100 wt % |  |  |  |
|  | 4 | Sample 12 |  |  |  |  | 0.2 μm | 95 wt % | 0.8 μm | 5 wt % |  |

|  |  |  | State of Pore Size Distribution |  |  |  | Collection Efficiency (0.05 μm) | Regeneration Ratio (8 g/L) |
|---|---|---|---|---|---|---|---|---|
| Example | 5 | Sample 7 | None (Discontinuous) | Peak of 0.05-0.5 μm | None (Discontinuous) | Peak of 1.0-30 μm | 70% | 80% |
|  | 6 | Sample 8 | Peak of 0.02-0.05 μm | Peak of 0.05-0.5 μm | None (Discontinuous) | Peak of 1.0-30 μm | 95% | 86% |
|  | 7 | Sample 9 | Peak of 0.02-0.05 μm | Peak of 0.05-0.5 μm | Peak of 0.5-1.0 μm | Peak of 1.0-30 μm | 95% | 90% |
|  | 8 | Sample 10 | Presence (Continuous) | Peak of 0.05-0.5 μm | Presence (Continuous) | Peak of 1.0-30 μm | 85% | 84% |

-continued

| | | | | | | | |
|---|---|---|---|---|---|---|---|
| Comparative Example | 3 | Sample 11 | Peak of 0.05-0.5 μm | None (Discontinuous) | Peak of 1.0-30 μm | 30% | 56% |
| | 4 | Sample 12 | Peak of 0.05-0.5 μm | Presence (Continuous) | Peak of 1.0-30 μm | 30% | 60% |

Example 3

This example is conducted for confirming the action and effect when ceramic members of cordierite (Sample No. 13 to 18) are produced by changing pore size, pore size distribution and surface roughness and a catalyst coat layer of platinum-containing alumina is formed on the surface thereof. The production methods in Examples 9 to 12 and Comparative Examples 5 and 6 are summarized in Table 3. Moreover, the production method of the ceramic member is as follows.

Firstly, 45 wt % of talc (average particle size: 10 μm), 15 wt % of kaolin (average particle size: 10 μm), 23 wt % of alumina (average particle size: 10 μm) and 17 wt % of silica (average particle size: 10 μm) are mixed as a starting material. This is called as a cordierite starting powder. In order to prepare a ceramic member having a target pore size distribution, acryl particles having various shapes (density: 1.1 g/cm$^3$) (as "powder C") is mixed with the above cordierite starting powder at a given volume ratio. Then, the cordierite starting powder is added and mixed with methylcellulose as a molding assist at a given weight ratio. Next, a dispersion medium comprising an organic solvent and water is added and the all of the starting materials are kneaded. Finally, the kneaded mixture is extrusion-molded by using a die so as to take a target honeycomb shape, whereby a honeycomb molded body having many through-holes (cells) is produced, and either end portions of the through-holes (cells) are sealed in a checkered pattern to obtain a raw molded body.

Then, the raw molded body is dried at 150° C., degreased at 500° C. and then fired in an inert gas atmosphere at 800° C. for 6 hours to obtain a sample of a cordierite ceramic member having a size of 144 mm in diameter×150 mm and 300 cells/in$^2$.

Then, in order to give plural peaks of pore size distribution as shown in the invention, 60 g/L of alumina coat and 2 g/L of Pt are supported on the sample by using alumina having a particle size shown in Table 3 likewise Example 1.

With respect to these samples, the pore diameter is measured by a mercury pressure method (according to JIS R 1655 (2003)).

As a result, some maximum values are existent in the pore size distribution. The numerical values thereof are shown in Table 3.

Then, a gas containing particles of 0.05 nm is made flow through the each sample at a section flow rate of 5 m/s, while the filtration efficiency is measured to determine the collection efficiency. The results are also shown in Table 3.

A regeneration experiment after the collection of 6 g/L is conducted. With respect to the samples (No. 9 to 12), as shown in Table 3, the regeneration ratio becomes higher in the case when the plural peaks are existent.

| | | | Particle Size of Alumina Material | | | | | | | | State of Pore Size Distribution |
|---|---|---|---|---|---|---|---|---|---|---|---|
| Example | 9 | Sample 13 | 0.01 μm | 50 wt % | | | 0.2 μm | 50 wt % | | | Peak of 0.006-0.02 μm |
| | 10 | Sample 14 | 0.01 μm | 25 wt % | 0.035 μm | 25 wt % | 0.2 μm | 50 wt % | | | Peak of 0.006-0.02 μm |
| | 11 | Sample 15 | 0.01 μm | 25 wt % | 0.035 μm | 25 wt % | 0.2 μm | 25 wt % | 0.8 μm | 25 wt % | Peak of 0.006-0.02 μm |
| | 12 | Sample 16 | 0.01 μm | 45 wt % | 0.035 μm | 5 wt % | 0.2 μm | 45 wt % | 0.8 μm | 5 wt % | Peak of 0.006-0.02 μm |
| Comparative Example | 5 | Sample 17 | | | | | 0.2 μm | 100 wt % | | | |
| | 6 | Sample 18 | | | | | 0.2 μm | 95 wt % | 0.8 μm | 5 wt % | |

| | | | State of Pore Size Distribution | | | | Collection Efficiency (0.05 μm) | Regeneration Ratio (8 g/L) |
|---|---|---|---|---|---|---|---|---|
| Example | 9 | Sample 13 | None (Discontinuous) | Peak of 0.05-0.5 μm | None (Discontinuous) | Peak of 1.0-30 μm | 70% | 68% |
| | 10 | Sample 14 | Peak of 0.02-0.05 μm | Peak of 0.05-0.5 μm | None (Discontinuous) | Peak of 1.0-30 μm | 95% | 77% |
| | 11 | Sample 15 | Peak of 0.02-0.05 μm | Peak of 0.05-0.5 μm | Peak of 0.5-1.0 μm | Peak of 1.0-30 μm | 95% | 80% |
| | 12 | Sample 16 | Presence (Continuous) | Peak of 0.05-0.5 μm | Presence (Continuous) | Peak of 1.0-30 μm | 85% | 75% |
| Comparative Example | 5 | Sample 17 | | Peak of 0.05-0.5 μm | None (Discontinuous) | Peak of 1.0-30 μm | 30% | 51% |
| | 6 | Sample 18 | | Peak of 0.05-0.5 μm | Presence (Continuous) | Peak of 1.0-30 μm | 30% | 55% |

The invention claimed is:

1. A ceramic honeycomb structural body comprising one pillar shape porous ceramic member or formed by bundling a plurality of the ceramic members in which many cells as a gas path are arranged in parallel through cell walls in a longitudinal direction and one ends of these cells are sealed, characterized in that the cell wall is made from a sintered body having a pore structure that in a pore size distribution curve wherein an abscissa is a pore diameter ($\mu$m) and an ordinate is a log differential pore volume ($cm^3/g$), when pores having a pore size ranging from 1.0 $\mu$m to about 150 $\mu$m are a first pore group and pores having a pore size ranging from about 0.006 or more to less than 1.0 $\mu$m are a second pore group, one peak in the pore size distribution is existent in the first pore group region and plural peaks in the pore size distribution are existent in the second pore group region.

2. A ceramic honeycomb structural body according to claim 1, wherein the peak of the pore size distribution appearing in the second pore group region is existent respectively in pore sizes ranging from about 0.006 or more to less than 0.05 $\mu$m and ranging from 0.05 to 1.0 $\mu$m.

3. A ceramic honeycomb structural body according to claim 1, wherein and that the pore distribution having a pore diameter ranging from about 0.1 to 1.0 $\mu$m appearing in the second pore group is represented by a feature that a curve of a value of the log differential pore volume is continuous.

4. A ceramic honeycomb structural body according to claim 1, wherein the pore distribution having a pore diameter ranging from about 0.01 to 1.0 $\mu$m appearing in the second pore group is represented by a feature that a curve of a value of the log differential pore volume is continuous.

5. A ceramic honeycomb structural body according to claim 1, wherein the pores existent between peaks appearing in the curve of the pore size distribution are represented by a feature that the values of the log differential pore volume are continuous.

6. A ceramic honeycomb structural body according to claim 1, wherein the cell wall is made from a porous silicon carbide.

7. A ceramic honeycomb structural body according to claim 1, which is structured by the combination of the porous ceramic members, with a seal material layer being disposed between them.

8. A ceramic honeycomb structural body according to claim 1, which is structured by one porous ceramic member.

9. A ceramic honeycomb structural body according to claim 1, wherein a catalyst is carried on the porous ceramic member.

10. A ceramic honeycomb structural body according to claim 1, which is used as a filter for the purification of an exhaust gas in vehicles.

11. A ceramic honeycomb structural body comprising:
at least one porous ceramic member having a plurality of cells defined by cell walls, said plurality of cells extend longitudinally through said at least one porous ceramic member, one end of each cell of said plurality of cells being sealed,
wherein said cell walls have a pore structure that is represented by a pore size distribution curve in which an abscissa is a pore diameter and an ordinate is a log differential pore volume, wherein said pore size distribution curve has one peak in a first pore group region and plural peaks in a second pore group region, wherein said first pore group region is defined as pores having a pore size ranging from 1.0 $\mu$m to about 150 $\mu$m, and wherein said second pore group region is defined as pores having a pore size ranging from about 0.006 or more to less than 1.0 $\mu$m.

12. A ceramic honeycomb structural body according to claim 11, wherein a first peak in said second pore group region is present along said pore size distribution curve within pore sizes ranging from about 0.006 or more to less than 0.05 $\mu$m, and wherein a second peak in said second pore group region is present along said pore size distribution curve within pore sizes ranging from 0.05 to 1.0 $\mu$m.

13. A ceramic honeycomb structural body according to claim 11, wherein the pore size distribution having a pore diameter ranging from about 0.1 to 1.0 $\mu$m appearing in said second pore group region is represented by a feature that a curve of a value of the log differential pore volume is continuous.

14. A ceramic honeycomb structural body according to claim 11, wherein the pore size distribution having a pore diameter ranging from about 0.01 to 1.0 $\mu$m appearing in said second pore group region is represented by a feature that a curve of a value of the log differential pore volume is continuous.

15. A ceramic honeycomb structural body according to claim 11, wherein pores existent between peaks appearing in said pore size distribution curve are represented by a feature that values of the log differential pore volume are continuous.

16. A ceramic honeycomb structural body according to claim 11, wherein said cell wall is made from a porous silicon carbide.

17. A ceramic honeycomb structural body according to claim 11, wherein said least one porous ceramic member is formed of a plurality of porous ceramic members with a seal material layer being disposed between said plurality of porous ceramic members.

18. A ceramic honeycomb structural body according to claim 11, wherein said least one porous ceramic member is formed of one pillar shaped porous ceramic member.

19. A ceramic honeycomb structural body according to claim 11, wherein a catalyst is carried on said at least one porous ceramic member.

20. A filter of for purification of exhaust gas of a vehicle, said filter comprising a ceramic honeycomb structural body including at least one porous ceramic member having a plurality of cells defined by cell walls, said plurality of cells extend longitudinally through said at least one porous ceramic member, one end of each cell of said plurality of cells being sealed,
wherein said cell walls have a pore structure that is represented by a pore size distribution curve in which an abscissa is a pore diameter and an ordinate is a log differential pore volume, wherein said pore size distribution curve has one peak in a first pore group region and plural peaks in a second pore group region, wherein said first pore group region is defined as pores having a pore size ranging from 1.0 $\mu$m to about 150 $\mu$m, and wherein said second pore group region is defined as pores having a pore size ranging from about 0.006 or more to less than 1.0 $\mu$m.

* * * * *